United States Patent
Roeland et al.

(10) Patent No.: US 10,742,544 B2
(45) Date of Patent: Aug. 11, 2020

(54) METHOD AND NETWORK NODES FOR SCALABLE MAPPING OF TAGS TO SERVICE FUNCTION CHAIN ENCAPSULATION HEADERS

(71) Applicant: TELEFONAKTIEBOLAGET LM ERICSSON (PUBL), Stockholm (SE)

(72) Inventors: Dinand Roeland, Sollentuna (SE); Calin Curescu, Hässelby (SE); Joao Monteiro Soares, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 15/735,403

(22) PCT Filed: May 26, 2016

(86) PCT No.: PCT/SE2016/050488
§ 371 (c)(1),
(2) Date: Dec. 11, 2017

(87) PCT Pub. No.: WO2016/204673
PCT Pub. Date: Dec. 22, 2016

(65) Prior Publication Data
US 2020/0036629 A1 Jan. 30, 2020

Related U.S. Application Data
(60) Provisional application No. 62/175,925, filed on Jun. 15, 2015.

(51) Int. Cl.
*H04L 12/725* (2013.01)
*H04L 12/24* (2006.01)
(Continued)

(52) U.S. Cl.
CPC ........ *H04L 45/306* (2013.01); *H04L 41/0893* (2013.01); *H04L 45/74* (2013.01);
(Continued)

(58) Field of Classification Search
CPC ... H04L 45/306; H04L 41/0893; H04L 45/74; H04L 47/125; H04L 47/2441;
(Continued)

(56) References Cited

U.S. PATENT DOCUMENTS 10,116,553 B1 * 10/2018 Penno ................. H04L 45/306
2012/0281540 A1 11/2012 Khan et al.
(Continued)

FOREIGN PATENT DOCUMENTS

WO 2016114701 A1 7/2016

OTHER PUBLICATIONS

Quinn et al., "Network Service Header", Network Working Group, Internet-draft, draft-ietf-sfc-nsh-00.txt (Mar. 24, 2015). (42 pages).
(Continued)

*Primary Examiner* — Kashif Siddiqui
(74) *Attorney, Agent, or Firm* — Sage Patent Group

(57) ABSTRACT

A method performed by a network node includes the network node receiving, from a first portion of a service chain, a packet having a header portion that includes a first service chain path ID and a metadata field. The method further includes the network node retrieving, according to one or more predefined rules, one or more tags included in the metadata field. The method further includes the network node generating a second service chain path ID based on the one or more retrieved tags. The method further includes the network node replacing the first service chain path ID by inserting the second service chain path ID in the header
(Continued)

portion, where the packet is forwarded, to a second portion of the service chain, in accordance with the second service chain path ID.

16 Claims, 5 Drawing Sheets

(51) Int. Cl.
| | |
|---|---|
| H04L 12/741 | (2013.01) |
| H04L 12/803 | (2013.01) |
| H04L 12/851 | (2013.01) |
| H04L 29/06 | (2006.01) |
| H04W 28/02 | (2009.01) |
| H04W 28/08 | (2009.01) |

(52) U.S. Cl.
CPC ........ *H04L 47/125* (2013.01); *H04L 47/2441* (2013.01); *H04L 47/2483* (2013.01); *H04L 69/22* (2013.01); *H04W 28/0273* (2013.01); *H04W 28/08* (2013.01)

(58) Field of Classification Search
CPC ............... H04L 47/2483; H04L 69/22; H04W 28/0273; H04W 28/08
See application file for complete search history.

(56) References Cited

U.S. PATENT DOCUMENTS

| | | | | |
|---|---|---|---|---|
| 2014/0334488 A1* | 11/2014 | Guichard | .............. | H04L 45/306 370/392 |
| 2014/0362857 A1* | 12/2014 | Guichard | .............. | H04L 45/566 370/392 |
| 2015/0063102 A1* | 3/2015 | Mestery | .................. | H04L 41/12 370/230 |
| 2016/0099874 A1* | 4/2016 | Hu | ...................... | H04L 12/6418 370/236 |
| 2017/0064039 A1* | 3/2017 | Shen | ..................... | H04L 67/327 |

OTHER PUBLICATIONS

Halpern et al., "Service Function Chaining (SFC) Architecture", Network Working Group, Internet-Draft, draft-ietf-sfc-architecture-09 (Jun. 7, 2015). (29 pages).

Zhang et al., "Service Chain Header", Network Working Group, Internet-Draft, draft-zhang-sfc-sch-01 (May 9, 2014). (15 pages).

International Search Report and Written Opinion issued in International Application No. PCT/SE2016/050488, dated Aug. 16, 2016, 13 pages.

Haeffner, V. et al., Internet Draft, "Service Function Chaining Use Cases in Mobile Networks; draft-ietf-sfc-use-case-mobility-03.txt", Internet Engineering Task Force, IETF; Standard Working Draft, Internet Society (ISOC), Geneva, Switzerland, Jan. 13, 2015, 25 pages.

Halpern, J. et al., Internet Draft, "Service Function Chaining (SFC) Architecture; draft-ietf-sfc-architecture-09.txt", IETF; Standard Working Draft, Internet Society (ISOC), Geneva, Switzerland, Jun. 8, 2015, 29 pages.

Quinn, P. et al., Internet Draft, "Network Service Header; draft-ietf-sfc-nsh-00.txt", Standard Working Draft, Internet Society (IOSC), Geneva, Switzerland, Mar. 24, 2015, 39 pages.

Halpern, J. et al., RFC 7665, "Service Function Chaining (SFC) Architecture", Internet Engineering Task Force (IETF), Oct. 2015, 32 pages.

Quinn, F. et al., Internet Draft, "Network Service Header (NSH), draft-ietf-afc-nsh-28", Service Function Chaining, Nov. 3, 2017, 40 pages.

Zhang, H. et al., Internet Draft, "Network Service Header (NSH), draft-zhang-sfc-sch-03", Network Working Group, Goldman Sachs, Dec. 23, 2014, 17 pages.

\* cited by examiner

METHOD AND NETWORK NODES FOR SCALABLE MAPPING OF TAGS TO SERVICE FUNCTION CHAIN ENCAPSULATION HEADERS

CROSS REFERENCE TO RELATED APPLICATION(S)

This application is a 35 U.S.C. § 371 National Stage of International Patent Application No. PCT/SE2016/050488, filed May 26, 2016, designating the United States and claiming priority to U.S. Provisional Application No. 62/175,925, filed on Jun. 15, 2015. The above identified applications are incorporated by reference.

TECHNICAL FIELD

Disclosed herein are, for example, methods and network nodes for scalable mapping of tags to service function chain encapsulation headers.

BACKGROUND

A network service function is a middle box in a network that is responsible for a specific treatment of packets that it receives. The network service function can act on the received packets at one or multiple network/OSI layer(s) based on the intended functionality. There can be multiple such network service function middle boxes in a network providing different functionalities and/or multiple instances of the same functionalities. With the advent of NFV (Network Function Virtualization), the middle boxes are increasingly becoming virtualized, which helps in their flexible and on demand deployment in the network. Packets based on various policies, may be required to pass through a series of above-mentioned middle boxes. An ordered set of network service function middle boxes that packets must pass through is called service function chaining (also referred to as service chaining). Based on policy classification, a packet or a series of packets (also referred to as flow) might be required to follow a certain service chain. In a network, there can be multiple distinct service chains needed to realize various policy setting in a network. There can also be multiple instance of a service chain in order to balance load between instances of middle boxes that make up the service chains. It is also possible to have a middle box that is a part to multiple service chains.

A service chain may define an ordered set of service functions that must be applied to packets and/or frames selected as a result of classification. The implied order may not be a linear progression as the architecture allows for nodes that copy to more than one branch. Steering the traffic through the middle boxes in a service chain requires configuration of network forwarding elements—such as switches, routers, and Software Defined Networking (SDN) switches—along the path of the service chain for each packet flow. The forwarding rules not only define the path taken by the packet flow in the network but also the middle boxes the packet flow has to enter in the service chain. All these forwarding rules that have to be configured per flow in network forwarding elements can lead to increased states in these elements and can affect their internal lookup time required to forward packets.

The conventional approach to implementing service chaining is by installing flow rules in the network forwarding elements for each packet flow, which may not be efficient and flexible. Solutions to solve these problems are all based on appending a header to the packet that identifies the service chain that the packet should follow.

Another solution involves IETF Service Function Chain (SFC) Encapsulation. The IETF RFC 7665 specifies a set of architectural components that compose a service chain enabled domain, such as the SFC encapsulation. This encapsulation intends to insert a new protocol header that encapsulates the packets and guides them through the service functions (middle boxes) within service chains. The header includes the Service Function Path ID, and can additionally carry metadata including data plane context information. Two proposals are currently available for the SFC encapsulation: Network Service Header (NSH) and Service Chain Header (SFH).

Moreover, the SFC encapsulation requires service functions (middle) boxes to understand the new protocol (process the header) or use a proxy in the switches to do the same. However, SFC encapsulation is not suitable for regular network packet forwarding. Such forwarding relies on overlay technologies (e.g. VLAN, VxLAN, GRE, MPLS).

Another solution, efficient mobile service chaining, provides a scalable solution for mobility in combination with service chaining. The solution is based on the concept of a new core network architecture where a location registry is kept up-to-date with the current location of each mobile device. The location registry can be implemented in several ways, including in a distributed fashion.

Packets are marked with one or more tags, where a tag has a name and a value. The combination of tags defines the service chain and destination for that packet. Aggregation is achieved by using the same tag for multiple flows and multiple devices, thereby limiting the number of entries in the service chain forwarding elements. Packets are tagged by one or more classifiers.

At a mobility event, at least one classifier gets updated such that packets for that device get marked with the same tag names, but where one or more tags have an updated value. The updated value reflects the new location of the mobile device. Forwarding elements can be configured on how packets with a specific tag are to be forwarded. Most forwarding elements of this configuration, and in typical cases all configurations, do not need to be updated upon mobility events. This keeps the control signaling towards the forwarding elements to a minimum.

The conventional way to realize service chains, especially in SDN, is by installing forwarding rules for all the flows in the network. However this approach is very inefficient and results in an explosion of forwarding rules in the network forwarding elements, which might also affect the look up times while forwarding a packet.

The approach of using a single field of fixed size to identify the chain (in both NSH and SCH the Service Function Path ID—SFP ID—has a fixed size), can be a limiting factor, especially in mobility scenarios where a solution able to scale well is needed. Current proposals (e.g., IETF) have the underlying assumption that the service chaining is done outside mobile networks (i.e. above mobile anchor points, and in 3GPP technologies, above the PDN Gateway). However, being able to perform service chaining within the mobile network segment can bring several benefits, such as: to bring service functions closer to the end-users (such as in the Mobile Service Routing in a Network Environment case) inside the mobile network. However, this brings the complexity associated to the mobile network, such as the signaling required to update the chain due to mobility events. If one considers establishing service chains on a per-user basis, this further increases the burden on the network forwarding elements. Other traditional encapsulation technologies (e.g. MPLS, VLAN) cannot provide the required scalability either since they do not support appending multiple tags for chain identification.

SUMMARY

According to some embodiments, a method performed by a network node comprises the network node receiving, from a first portion of a service chain, a packet having a header portion that includes a first service chain path ID and a metadata field. The method further includes the network node retrieving, according to one or more predefined rules, one or more tags included in the metadata field. The method further includes the network node generating a second service chain path ID based on the one or more retrieved tags. The method further includes the network node replacing the first service chain path ID by inserting the second service chain path ID in the header portion, where the packet is forwarded, to a second portion of the service chain, in accordance with the second service chain path ID.

In some embodiments, a network node includes a processor, and a computer readable medium coupled to the processor, where the computer readable medium contains instructions executable by the processor. The network node is operative to receive, from a first portion of a service chain, a packet having a header portion that includes a first service chain path ID and a metadata field, retrieve, according to one or more predefined rules, one or more tags included in the metadata field, generate a second service chain path ID based on the one or more retrieved tags, and replace the first service chain path ID by inserting the second service chain path ID in the header portion, where the packet is forwarded, to a second portion of the service chain, in accordance with the second service chain path ID.

BRIEF DESCRIPTION OF THE DRAWINGS

The accompanying drawings, which are incorporated herein and form part of the specification, illustrate various embodiments.

DETAILED DESCRIPTION

Embodiments are directed to using an SFC Encapsulation header to extend scalability for a multiple tag solution. In some embodiments, multiple tags can be embedded in a SFC Encapsulation header (e.g., IETF, NSH, or SCH), which is used for SFC forwarding. Tag information can be based on, for example, the result of classification of the packet's 5-tuple, or on other aspects like geographical location, switch location, switch source port, etc.

As understood by one of ordinary skill in the art, embodiments are not limited to the IETF specifications and may include other specifications suitable for other types of encapsulation headers. Other embodiments may be done by relying on legacy technologies, such as VXLAN, VLAN, MPLS, or any other legacy technology known to one of ordinary skill in the art. According to some embodiments, a packet header includes a dedicated field used to take switching decisions (e.g., SFP ID in IETF NSH or SCH, or the VLAN ID in VLAN) combined with a variable-size field used to carry metadata (e.g., the metadata field in NSH or SCH, options in IPv6, etc).

Figure 1:
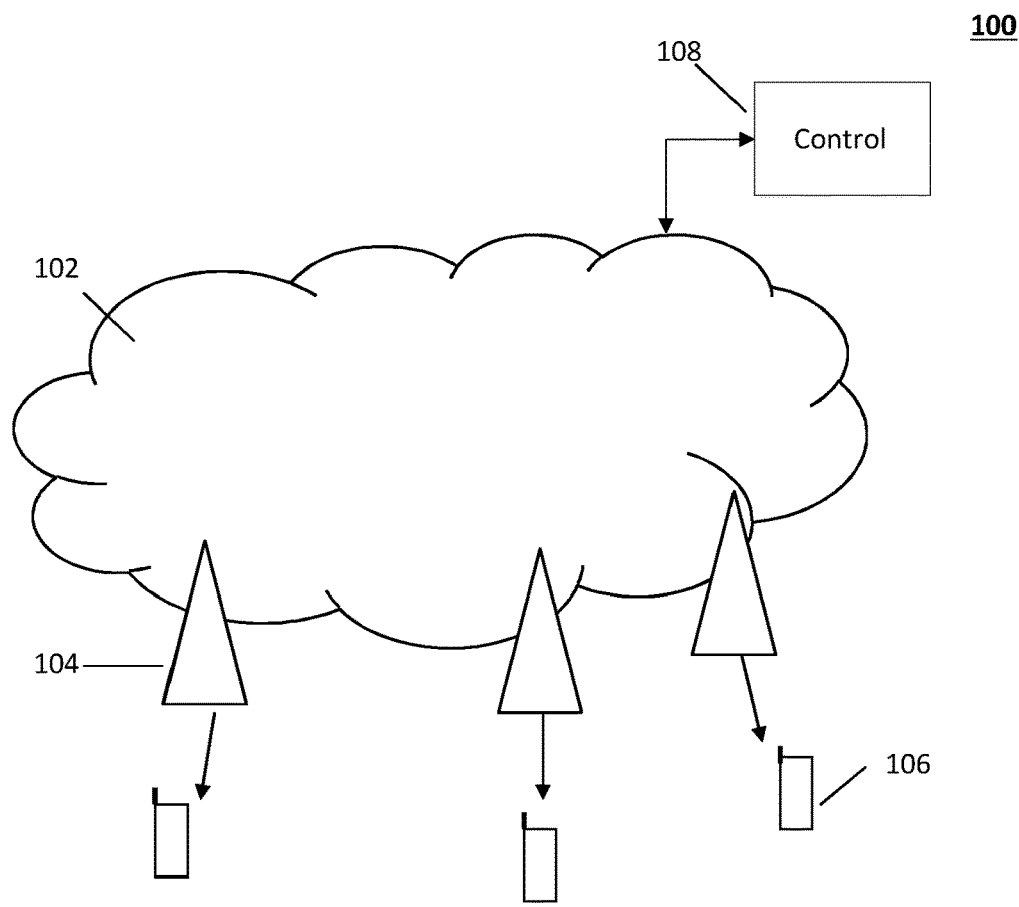
FIG. 1 illustrates an exemplary wireless communication system according to some embodiments.

Referring to FIG. 1, a wireless communication deployment 100 in accordance with exemplary embodiments includes an access node 104 serving a wireless communication device (WCD) 106. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 106 may be a legacy UE. Access node 104 may be, for example, a base station, an eNodeB, a WLAN Access Point, relay node, or gateway type device, and is capable of communicating with device 106, along with any additional elements suitable to support wireless communication between wireless communication devices or between a wireless communication device and another communication device, such as landline telephone. The access node 104 may be in communication with, for instance via a network 102, one or more control nodes 108, such as a Radio Network Controller (RNC), a Mobility Management Entity (MME), a Mobile Switching Center (MSC), a WLAN Access Gateway, evolved Packet Data Gateway (ePDG) or Base Station Subsystem (BSS). Although node 108 is explicitly identified as a control node, each of nodes 104, 106, and 108 may be understood as a "control" node to the extent that it includes a control unit or otherwise implements control functions.

According, to some embodiments, any number of tags can be embedded in a SFC Encapsulation header (e.g. IETF NSH, or SCH). Embodiments allow the ability to append multiple tags to a SFC Encapsulation header, and for packets to be forwarded based on those tags. Combining an arbitrary number of tags in the SFP ID field of the SFC Encapsulation Header is not possible since its scalability is limited due to the SFP ID fixed size of 24 bits. Embodiments disclosed herein enable the embedding of multiple tags in one or more metadata fields of the SFC Encapsulation Header, which supports variable length, and the embedding of one or more tags, or derived tags, in the SFP ID field. Furthermore, embodiments disclosed herein enable the ability to perform, along a flow path, the replacement of the information in the SFP ID by one or more tags or derived tags from the tag information in the metadata.

Figure 2:
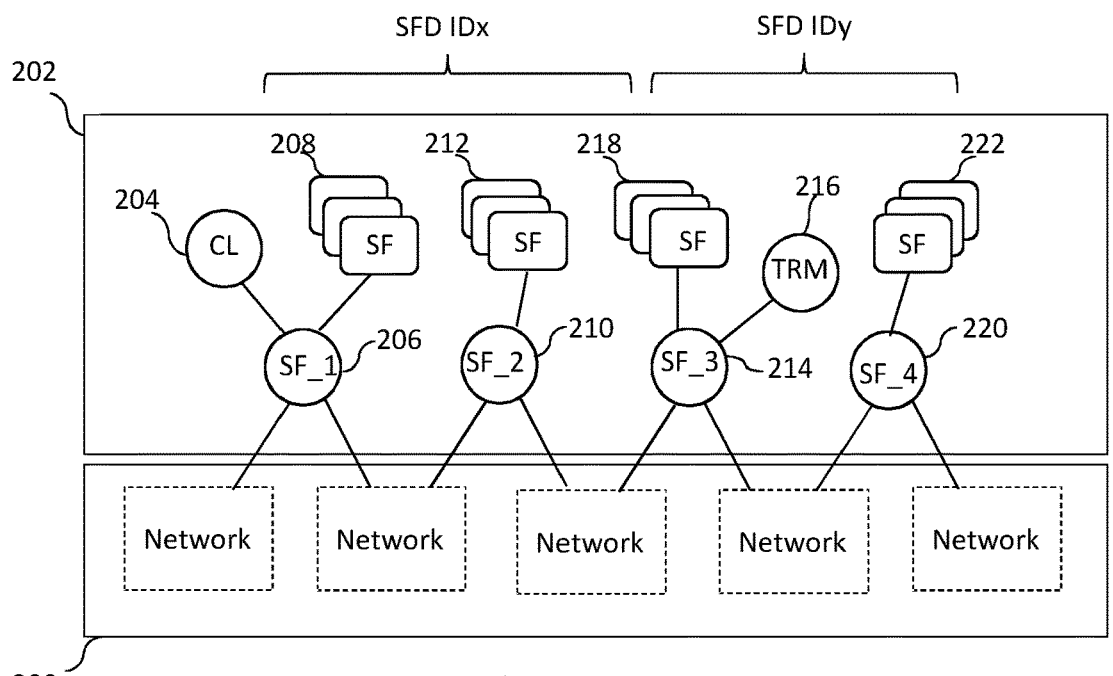
FIG. 2 illustrates an exemplary network architecture.

FIG. 2 illustrates a network architecture including a network transport layer 200 and a service function forwarding domain 202. According to some embodiments, the service function forwarding domain 202 includes at least four main entities: Service Function Forwarder (SFF)(206, 210, 214, 220), Classifier (CL)(204), Service Function (SF) (208, 212, 218, 222), and Tag Re-Mapper TRM (216).

In some embodiments, the CL 204 performs initial classification of packets when entering or within the Service Function Forwarding domain 202. The initial classification procedure may include, for example, looking to the packet 5-tuple or any other packet header field, appending a SFC Encapsulation Header to a received packet, and assigning, based on customer/network/service specific policies, the correspondent SF Encapsulation information (i.e. SFP ID, metadata, etc). The CL 204 may also insert the multiple tags into the metadata field of the SFC Encapsulation header. In some embodiments, the packet 5-tuple includes a source IP address, a destination IP address, a source port number, a destination port number, and a protocol in use.

In some embodiments, the SFF entity is responsible for forwarding traffic to one or more connected SFs according to information carried in the SFC encapsulation, as well as handling traffic coming back from the SF. Furthermore, the SFF may be responsible for delivering traffic to a classifier when needed, transporting traffic to another SFF), and terminating the SFP.

In some embodiments, a SF is responsible for specific treatment of received packets. A SF can act at various layers of a protocol stack (e.g., at the network layer or other OSI layers). Examples of treatments include, at the OSI layers, parental control or firewall, at the TCP level, at the IP level, packet counters, bandwidth limiters, functions to set QoS classes, and for functions below the IP level, radio air-link protocol handlers. In some embodiments, the SF is responsible for a type of subscriber such as user classes (i.e., subscribers that have ordered the parental control user class get forwarded through that SF), end-service types (i.e., marking voice traffic as a high-priority), and radio access types (i.e., handling the PDCP (Packet Data Convergence Protocol) protocol). The split-up of the network as in the figure above, and the definition of SF, SFF, and CL all follow the IETF SFC draft.

In some embodiments, the CL will take the set of tags or a subset of the tags and map it to a SFP ID. If there are few tags, then the SFP ID space (24 bits) may be enough to carry all the tags. The CL may also take a subset of the tags and map those to the SFP ID, or it could take a part of the information of one or more tags and make a SFP ID out of that. Embodiments may use either type of mapping based the number of tags and their length.

In some embodiments, if it is not possible to map all tag information to a single SFP ID, then there may be one or more re-mappings in the middle of the service function chain. The re-mapping may be performed by a Tag Re-Mapper (TRM) 216. In some embodiments, not every SFF needs to have a TRM. According to some embodiments, the TRM retrieves tags from the metadata and maps these to a new SFP ID. For example, as illustrated in FIG. 2, after the packet leaves the CL 204, the packet is forwarded according to SFP IDx. However, after leaving the TRM 216, the packet is forwarded according to SFP IDy. The mapping may be performed in the TRM in a similar way as in the classifier. Furthermore, although one TRM is illustrated in FIG. 2, it is understood by one of ordinary skill in the art that any desired number of TRM's may be included in the Service Function Forwarding domain 202, where a packet may be re-mapped any number of times.

The network architecture including the Service Function Forwarding layer 202 may be implemented, for example, in a Mobile Broadband offering that includes an end-to-end mobile service chaining mechanism. In this example, a tag is used in the downlink to denote the base station the user is currently attached to. As an example, the operator has 10,000 base stations. If every base station has a unique ID, then a tag of at least 14 bits is needed to encode these base stations ($2^{14}$=16,384).

The operator may deploy a number of service functions, SFs. These service functions could include, for example, NAT, firewall, bandwidth limiting, parental control, HTTP header enrichment, charging, TCP proxy, etc. As an example, there may be 20 such basic functions. If every function is either invoked or not, then this would already give $2^{20}$≈1M different function chains. Additionally, there may be different chains that use a different order of the SFs. Furthermore, some functions are mandatory, some could be grouped, and far from all permutations of SFs will be valid. As an example, 20 bits will be enough to encode all possible service chains.

Encoding these bits in a single field would require 14+20=34 bits, which is too much for the 24-bits SFP ID field. Additionally each base station may be in a region, where there may be 20 regions in total. These 20 regions can be encoded in 5 bits. A region may refer to, but is not limited to, a geographical area, a group of base stations, a group of UE's, or any other group of network entities known to one of ordinary skill in the art.

In this example, there would be three tags: service ID (20 bits), base station ID (14 bits), and region ID (5 bits). In the beginning of the chain, the CL may derive a smaller service ID' of 19 bits from the original service ID of 20 bits. Combining this with the region ID of 5 bits gives a total of 24 bits, which the CL stores in the SFP ID. When the packet gets forwarded, it will eventually enter a specific region, where once in that region, a TRM changes the SFP ID. The TRM may derive a smaller service ID'' from the service ID in the metadata. The service ID' may only be for the SFs that are still left to be traversed. As an example, the service ID' is 10 bits. The new SFP ID may contain the service ID' and the base station ID.

According to some embodiments, SFC encapsulation (e.g., NSH protocol, SCH protocol, or any other protocol that realizes SFC encapsulation) is used to encapsulate the tags. In some embodiments, the metadata field in the SFC Encapsulation header hosts the full set of tags, and the SFP ID field hosts the primary forwarding tag. The SF forwarding may be performed on the SFP ID.

Figure 3:
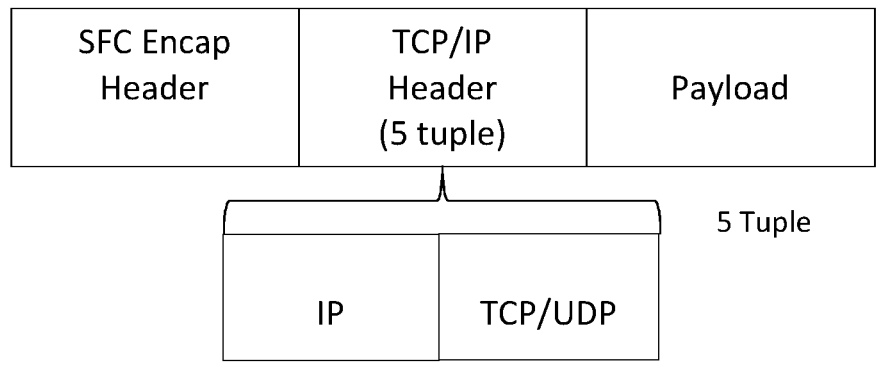
FIG. 3 illustrates an exemplary packet structure.
Figure 4:
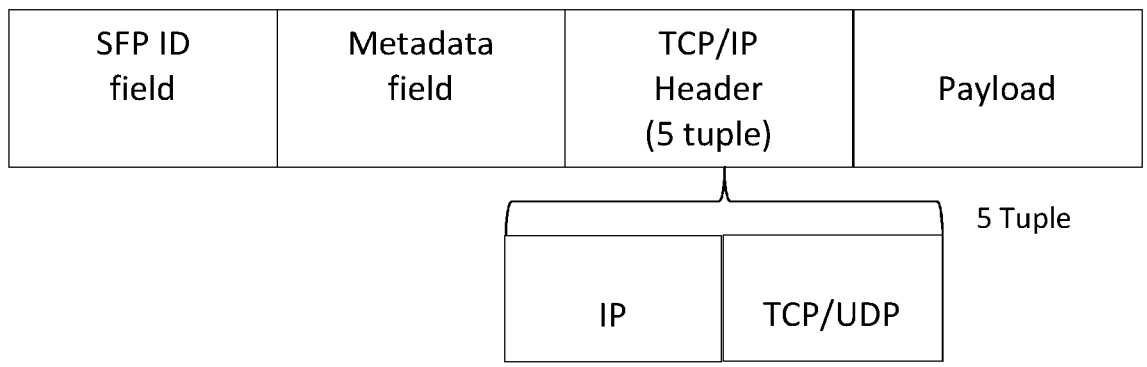
FIG. 4 illustrates an exemplary packet structure.

FIG. 3 illustrates an example packet that realizes SFC encapsulation. The packet includes an SFC Encapsulation Header, and may also include an IP Header followed by a transport layer header (e.g., TCP, UDP, etc.) and a payload section. FIG. 4 illustrates the packet with the SFC Encapsulation header expanded, which includes an SFP ID field and a metadata field.

In some embodiments, the CL function may be implemented either as an SF, or as an SDN control mechanism, which uses SDN-enabled switches as well as the data plane interfaces (e.g. OpenFlow) to support SFC encapsulation protocols. As an example, the packet may be manipulated while a flow transverses the forwarding domain. Furthermore, all classification policies may be previously defined.

Figure 5:
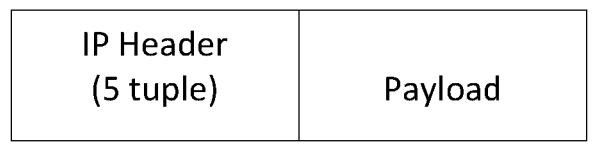
FIG. 5 illustrates an exemplary packet structure.
Figure 6:
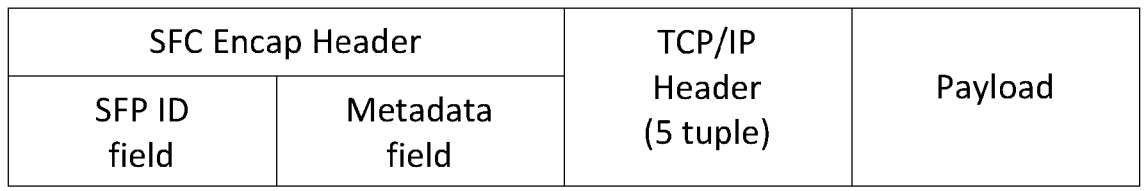
FIG. 6 illustrates an exemplary packet structure.

FIG. 5 illustrates an example of a packet that arrives at the CL for initial classification. As illustrated in FIG. 5, the packet does not include the SFC Encapsulation header prior to arriving at the CL. In some embodiments, the CL determines if there are any policies that apply to the arrived packet based on, for example, information included in the headers or payload. If one or more policies apply to the arrived packet, the CL appends an SFC Encapsulation header to the packet and includes one or more tags in the metadata field of the SFC Encapsulation header. The tags may include a tag for a service treatment, a tag for a base station ID, and a tag for a region ID. Using one or more of the tags in the metadata field, the CL may generate a service ID that includes a region ID, where the service ID is inserted in the SFP field. The CL may use any of the tags included in the metadata field, and any subfield of a tag included in the metadata field, to generate the service ID. FIG. 6 illustrates an example of the packet after the CL appends the SFC Encap header to the packet.

According to some embodiments, a TRM performs a remapping of a packet having the SFC Encap Header and service ID generated by the CL. The TRM may be associated with a region ID included in the service ID in the SFP field. For example, when a packet traversing through the service chain reaches a particular region, the TRM for the region will check if the service ID contains the region ID for the TRM. If the service ID contains a matching region ID, the TRM retrieves one or more tags from the metadata field and generates a new service ID that is different than the service ID generated by the CL. As an example, the TRM may use a different tag, or at least one subfield of a tag not used by the CL to generate a service ID that is different than the service ID generated by the CL. The service ID generated by the TRM may contain a base station ID.

Figure 7:
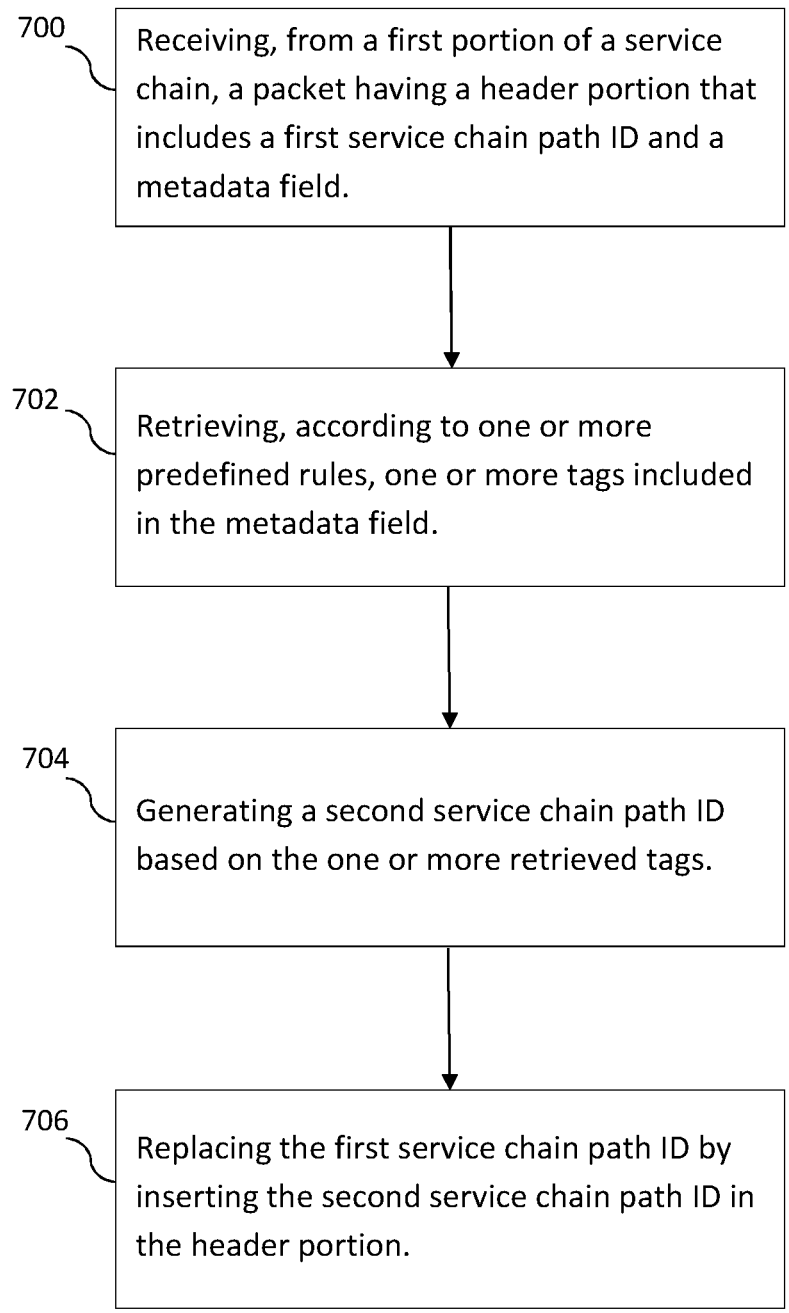
FIG. 7 is a flow chart illustrating a process according to some embodiments.

FIG. 7 illustrates an embodiment of a process performed by the TRM. The process may generally start at step 700 where the TRM receives, from a first portion of a service chain, a packet having a header portion that includes an a first service chain path ID and a metadata field. The process proceeds to step 702, where the TRM retrieves, according to one or more predefined rules, one or more tags included in the metadata field. The process proceeds to step 704, where the TRM generates a second service chain path ID based on the one or more retrieved tags. The process proceeds to step 706, where the TRM replaces the first service chain path ID by inserting the second service chain path ID in the header portion. After the TRM re-mapping process is completed, the packet may be forwarded, to a second portion of the service chain, in accordance with the second service chain path ID.

In some embodiments, the first service chain path ID is generated using at least one portion of a tag that is not used for generating the second service chain path ID. In some embodiments, the value of the first service chain path ID is different from the second service chain path ID generated from the retrieved one or more tags. In some embodiments, the first service chain path ID indicates a first area, and the second service chain path ID indicates a second area.

In some embodiments, the first and second areas indicate a topological set including one of: a geographical area, a base station set, and a UE set. In some embodiments, the first service chain path ID indicates a first set of subscribers and the second service chain path ID indicates a second set of subscribers. In some embodiments, the first and second subscribers are associated with at least one of: user classes, end-service types, and radio access types. In some embodiments, the first service chain path ID indicates a first service treatment and the second service chain path ID indicates a second service treatment.

In some embodiments, the first and second service treatments specify one of: different sets of service functions, different return paths, different virtual network types, different instance types related to load balancing or replication. In some embodiments, the service chain path ID and metadata field are from a Service Function Chain Encapsulation header. In some embodiments, the length of the ID field is less than the length of the metadata field. In some embodiments, the length of the ID field is fixed and the length of the metadata field is non-fixed.

In some embodiments, the service path chain ID field is a Service Function Path ID field. In some embodiments, the first and second portions of the service chains include one or more network service functions. In some embodiments, the one or more predefined rules are received from a network controller. In some embodiments, the first service chain path ID is generated by another network node that did not generate the tags for the metadata field.

Figure 8:
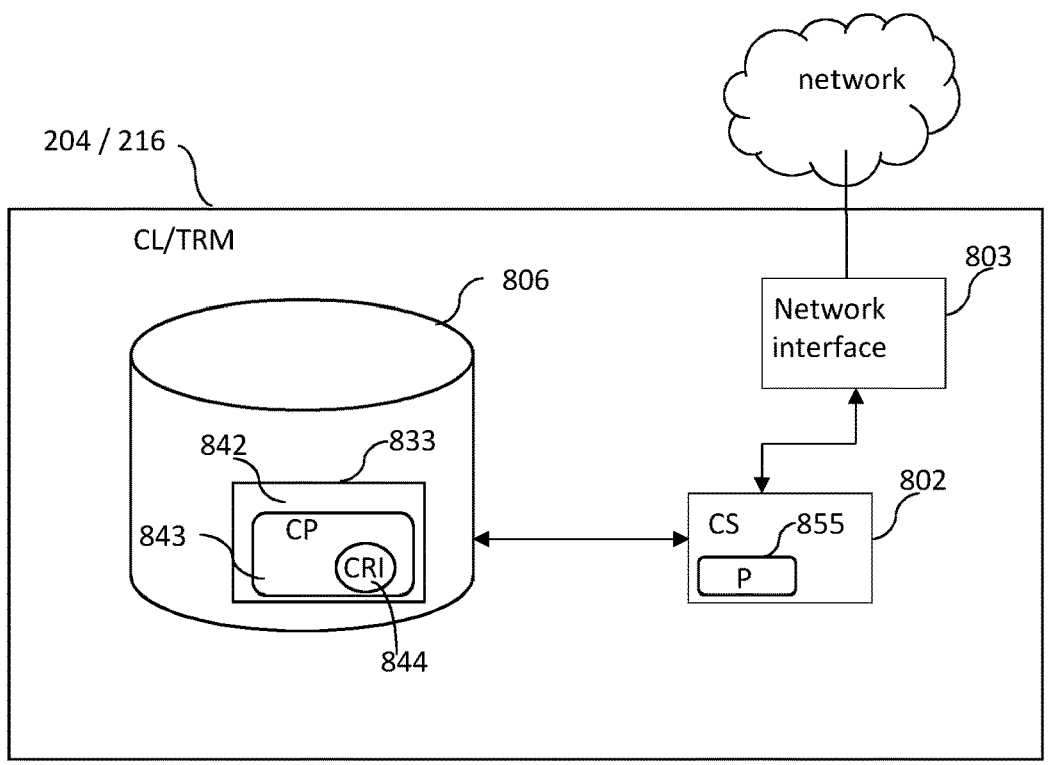
FIG. 8 is a block diagram of a control node according to some embodiments.

FIG. 8 is a block diagram of an embodiment of network node such as CL 204 or TRM 216. As shown in FIG. 8, the network node may include or consist of: a computer system (CS) 802, which may include one or more processors 855 (e.g., a general purpose microprocessor) and/or one or more circuits, such as an application specific integrated circuit (ASIC), field-programmable gate arrays (FPGAs), a logic circuit, and the like; a network interface 803 for use in connecting the network node to a network; and a data storage system 806, which may include one or more non-volatile storage devices and/or one or more volatile storage devices (e.g., random access memory (RAM)). In embodiments where the network node includes a processor 855, a computer program product (CPP) 833 may be provided. CPP 833 includes or is a computer readable medium (CRM) 842 storing a computer program (CP) 843 comprising computer readable instructions (CRI) 844. CRM 842 is a non-transitory computer readable medium, such as, but not limited to, magnetic media (e.g., a hard disk), optical media (e.g., a DVD), solid state devices (e.g., random access memory (RAM), flash memory), and the like. In some embodiments, the CRI 844 of computer program 843 is configured such that when executed by computer system 802, the CRI causes the network node to perform steps described above (e.g., steps described above with reference to the flow charts and message flows shown in the drawings). In other embodiments, the network node may be configured to perform steps described herein without the need for a computer program. That is, for example, computer system 802 may consist merely of one or more ASICs. Hence, the features of the embodiments described herein may be implemented in hardware and/or software.

Figure 9:
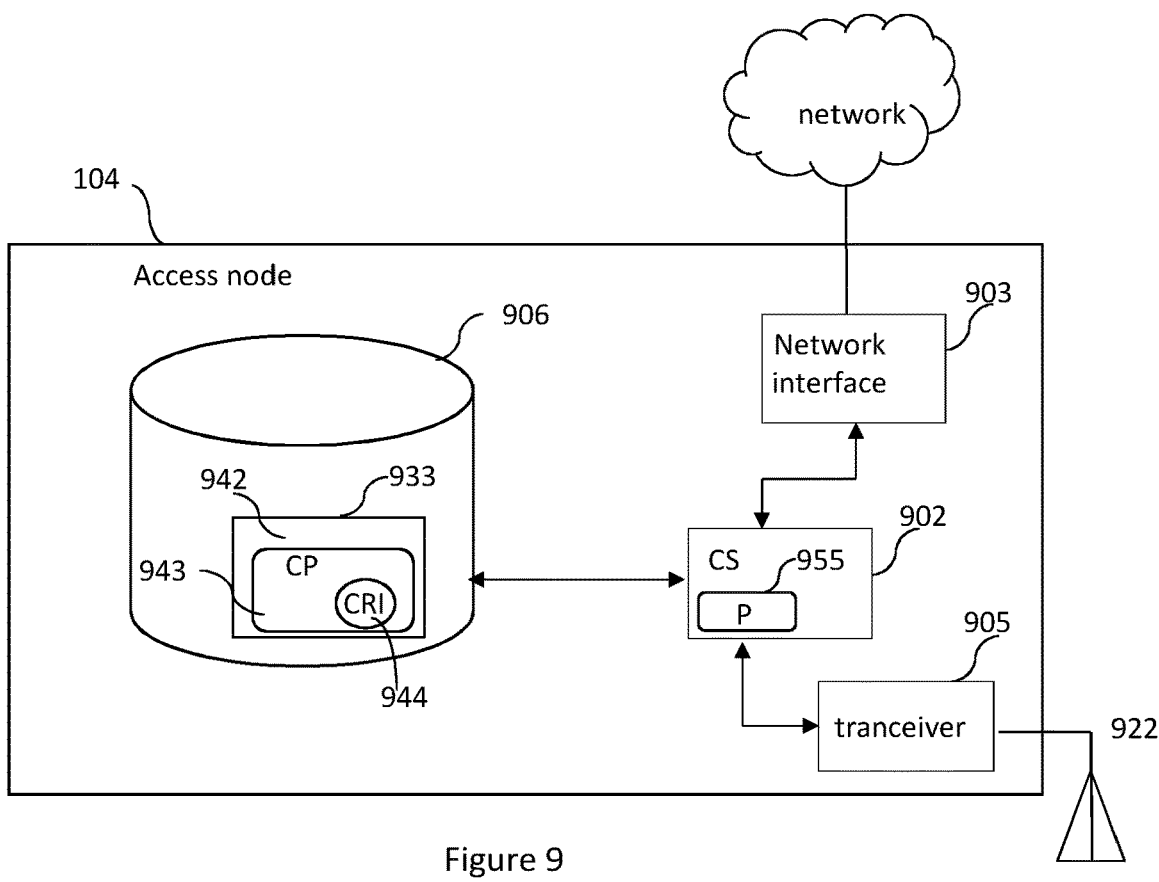
FIG. 9 is a block diagram of an access node according to some embodiments.

FIG. 9 illustrates a block diagram of an exemplary access node, such as node 104 shown in FIG. 1. As shown in FIG. 9, the access node 104 may include: a data processing system 902, which may include one or more microprocessors and/or one or more circuits, such as an application specific integrated circuit (ASIC), field-programmable gate arrays (FPGAs), and the like; a network interface 903; a transceiver 905, coupled to an antenna, 922 for transmitting and receiving data and a data storage system 906, which may include one or more non-volatile storage devices and/or one or more volatile storage devices (e.g., random access memory (RAM)). In embodiments where the access node includes a processor 955, a computer program product (CPP) 933 may be provided. CPP 933 includes or is a computer readable medium (CRM) 942 storing a computer program (CP) 943 comprising computer readable instructions (CRI) 944. CRM 942 is a non-transitory computer readable medium, such as, but not limited to, magnetic media (e.g., a hard disk), optical media (e.g., a DVD), solid state devices (e.g., random access memory (RAM), flash memory), and the like. In some embodiments, the CRI 944 of computer program 943 is configured such that when executed by a data processing system 902, the CRI causes the access node to perform steps described above (e.g., steps described above with reference to the flow charts and message flows shown in the drawings). In other embodiments, the access node may be configured to perform steps described herein without the need for a computer program. That is, for example, a data processing system 902 may consist merely of one or more ASICs. Hence, the features of the embodiments described herein may be implemented in hardware and/or software. According to some embodiments, the data processing system 902 may comprise a control unit used for selection of transmission parameters.

In embodiments where data processing system 902 includes a microprocessor, computer readable program code (CRPC) may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 902 to perform steps described above (e.g., steps described above with reference to the flow charts shown above). In other embodiments, the access node 104 is configured to perform steps described herein without the need for code. That is, for example, data processing system 902 may consist merely of one or more ASICs. Hence, the features of the embodiments described herein may be implemented in hardware and/or software. For example, in particular embodiments, the functional components of the base station described above may be implemented by data processing system 902 executing computer instructions, by data processing system 902 operating independent of any computer instructions, or by any suitable combination of hardware and/or software.

Figure 10:
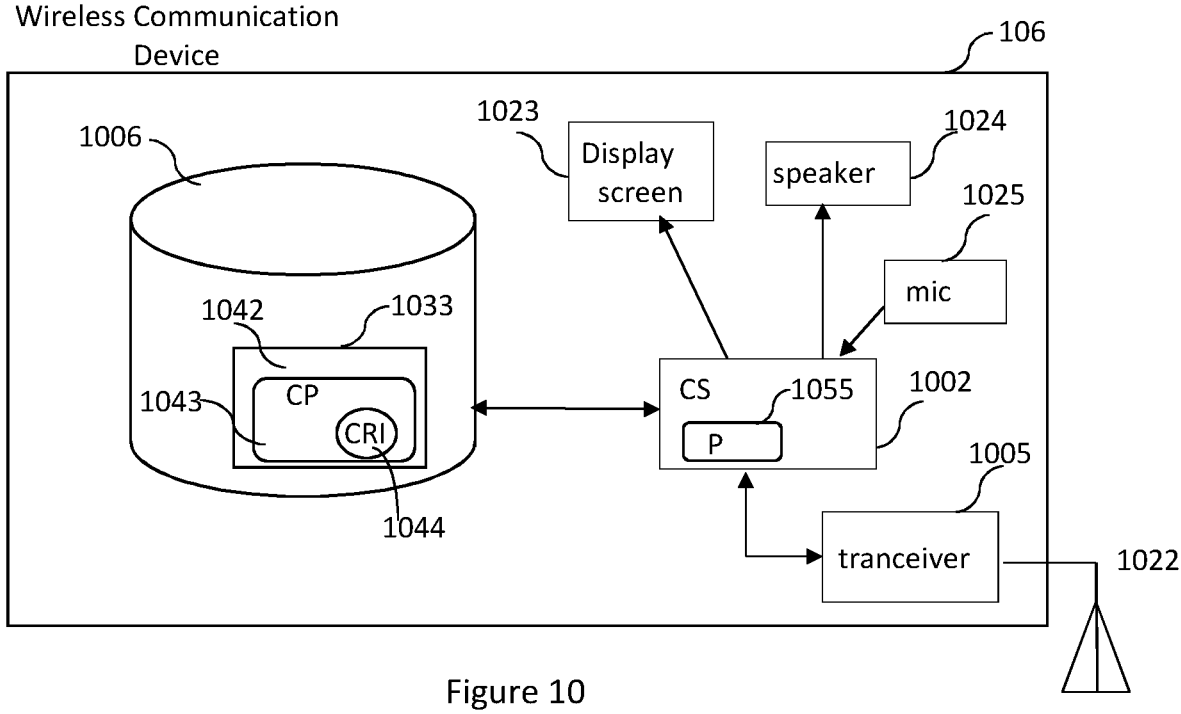
FIG. 10 is a block diagram of a UE according to some embodiments.

FIG. 10 is a block diagram of UE such as a wireless communication device according to some embodiments. As shown in FIG. 10, UE may include or consist of: a computer system (CS) 1002, which may include one or more processors 1055 (e.g., a general purpose microprocessor) and/or one or more circuits, such as an application specific integrated circuit (ASIC), field-programmable gate arrays (FPGAs), a logic circuit, and the like; a transceiver 1005, coupled to an antenna, 1022 for transmitting and receiving data wirelessly; and a data storage system 1006, which may include one or more non-volatile storage devices and/or one or more volatile storage devices (e.g., random access memory (RAM)). In embodiments where UE includes a processor 1055, a computer program product (CPP) 1033 may be provided. CPP 1033 includes or is a computer readable medium (CRM) 1042 storing a computer program (CP) 1043 comprising computer readable instructions (CRI) 1044. CRM 1042 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1044 of computer program 1043 is configured such that when executed by computer system 1002, the CRI causes the UE to perform steps described above (e.g., steps described above with reference to the flow charts and message flows shown in the drawings). In other embodiments, UE may be configured to perform steps described herein without the need for a computer program. That is, for example, computer system 1002 may consist merely of one or more ASICs. Hence, the features of the embodiments described herein may be implemented in hardware and/or software. As shown in FIG. 10, UE may include: a display screen 1023, a speaker 1024, and a microphone 1025, all of which are coupled to CS 1002.

Figure 11:
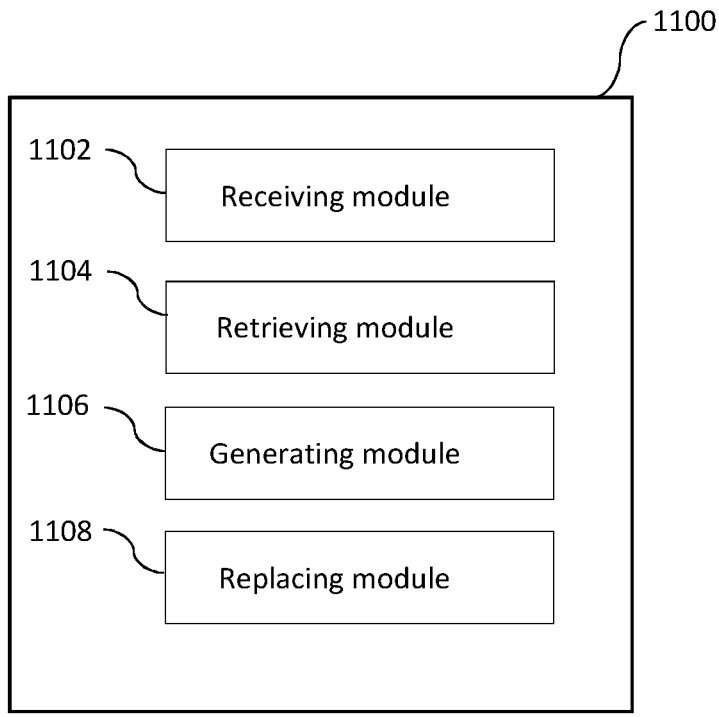
FIG. 11 is a functional diagram of a network node according to an embodiment of the invention.

FIG. 11 is a functional block diagram of a network node 1100 that is configured to perform steps described above (e.g., steps described above with reference to the flow charts and message flows shown in the drawings). The network node 1100 comprises a receiving module 1102 that is configured to receive, from a first portion of a service chain, a packet having a header portion that includes a first service chain path ID and a metadata field. The network node 1100 further comprises a retrieving module 1104 that is configured to retrieve one or more tags included in the metadata field, and a generating module 1106 that is configured to generate a second service chain path ID based on the one or more retrieved tags. The network node 1100 further comprises a replacing module 1108 that is configured to replace the first service chain path ID by inserting the second service chain path ID in the header portion.

It is to be noted that all modules 1102 to 1108 may be implemented as a one unit within an apparatus or as separate units or some of them may be combined to form one unit while some of them are implemented as separate units. In particular, all above described units might be comprised in one chipset or alternatively some or all of them might be comprised in different chipsets. In some implementations the above described modules might be implemented as a computer program product, e.g. in the form of a memory or as one or more computer programs executable from the memory of an apparatus.

Concise Description of Some Embodiments

A1. A method performed by a network node, the method comprising: the network node receiving, from a first portion of a service chain, a packet having a header portion that includes a first service chain path ID and a metadata field; the network node retrieving, according to one or more predefined rules, one or more tags included in the metadata field; the network node generating a second service chain path ID based on the one or more retrieved tags; and the network node replacing the first service chain path ID by inserting the second service chain path ID in the header portion, wherein the packet is forwarded, to a second portion of the service chain, in accordance with the second service chain path ID.

A2. The method according to A1, wherein the first service chain path ID is generated using at least one portion of a tag that is not used for generating the second service chain path ID.

A3. The method according to A1, wherein the value of the first service chain path ID is different from the second service chain path ID generated from the retrieved one or more tags.

A4. The method according to A1, wherein the first service chain path ID indicates a first area, and the second service chain path ID indicates a second area.

A5. The method according to A4, wherein the first and second areas indicate a topological set including one of: a geographical area, a base station set, and a UE set.

A6. The method according to A1, wherein the first service chain path ID indicates a first set of subscribers and the second service chain path ID indicates a second set of subscribers.

A7. The method according to A6, the first and second subscribers are associated with at least one of: user classes, end-service types, and radio access types.

A8. The method according to A1, wherein the first service chain path ID indicates a first service treatment and the second service chain path ID indicates a second service treatment.

A9. The method according to A8, wherein the first and second service treatments specify one of: different sets of service functions, different return paths, different virtual network types, different instance types related to load balancing or replication.

A10. The method according to A1, wherein the service chain path ID and metadata field are from a Service Function Chain Encapsulation header.

A11. The method according to A1, wherein the length of the ID field is less than the length of the metadata field.

A12. The method according to A1, wherein the length of the ID field is fixed and the length of the metadata field is non-fixed.

A13. The method according to A1, wherein the service path chain ID field is a Service Function Path ID field.

A14. The method according to A1, wherein the first and second portions of the service chains include one or more network service functions.

A15. The method according to A1, wherein the one or more predefined rules are received from a network controller.

A16. The method according to A1, wherein the first service chain path ID is generated by another network node that did not generate the tags for the metadata field.

A17. A network node comprising: a processor; and a computer readable medium coupled to the processor, said computer readable medium containing instructions executable by the processor, whereby the network node is operative to: receive, from a first portion of a service chain, a packet having a header portion that includes a first service chain path ID and a metadata field, retrieve, according to one or more predefined rules, one or more tags included in the metadata field, generate a second service chain path ID based on the one or more retrieved tags, and replace the first service chain path ID by inserting the second service chain path ID in the header portion, wherein the packet is forwarded, to a second portion of the service chain, in accordance with the second service chain path ID.

A18. The method according to A17, wherein the first service chain path ID is generated using at least one portion of a tag that is not used for generating the second service chain path ID.

A19. The method according to A17, wherein the value of the first service chain path ID is different from the second service chain path ID generated from the retrieved one or more tags.

A20. The method according to A17, wherein the first service chain path ID indicates a first area, and the second service chain path ID indicates a second area.

A21. The method according to A20, wherein the first and second areas indicate a topological set including one of: a geographical area, a base station set, and a UE set.

A22. The method according to A17, wherein the first service chain path ID indicates a first set of subscribers and the second service chain path ID indicates a second set of subscribers.

A23. The method according to A22, the first and second subscribers are associated with at least one of: user classes, end-service types, and radio access types.

A24. The method according to A17, wherein the first service chain path ID indicates a first service treatment and the second service chain path ID indicates a second service treatment.

A25. The method according to A24, wherein the first and second service treatments specify one of: different sets of service functions, different return paths, different virtual network types, different instance types related to load balancing or replication.

A26. The method according to A17, wherein the service chain path ID and metadata field are from a Service Function Chain Encapsulation header.

A27. The method according to A17, wherein the length of the ID field is less than the length of the metadata field.

A28. The method according to A17, wherein the length of the ID field is fixed and the length of the metadata field is non-fixed.

A29. The method according to A17, wherein the service path chain ID field is a Service Function Path ID field.

A30. The method according to A17, wherein the first and second portions of the service chains include one or more network service functions.

A31. The method according to A17, wherein the one or more predefined rules are received from a network controller.

A32. The method according to A17, wherein the first service chain path ID is generated by another network node that did not generate the tags for the metadata field.

The embodiments disclosed herein provide the significantly advantageous features of providing a solution that uses SFC protocols, extending the scalability of the SFC Encapsulation header by being able to embed and manage multiple tags, and not requiring a change to current proposals for SFC Encapsulation header.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

CL Classifier
GRE Generic Routing Encapsulation
IETF Internet Engineering Task Force
MPLS Multiprotocol Label Switching
NFV Network Function Virtualization
NSH Network Service Header
SDN Software Defined Networking
SF Service Function
SFC Service Function Chain
SFF Service Function Forwarder
SCH Service Chain Header
TRM Tag Re-Mapper
VLAN Virtual Local Area Network
VxLAN Virtual Extensible Local Area Network

The invention claimed is:

1. A method performed by a network node, the method comprising:
   the network node receiving, from a first portion of a service chain, a packet having a header portion that includes a first service chain path ID and a metadata field, wherein the first service chain path ID indicates a first area;
   the network node retrieving, according to one or more predefined rules, one or more tags included in the metadata field;
   the network node generating a second service chain path ID based on the one or more retrieved tags, wherein the second service chain path ID indicates a second area,
   wherein the first and second areas indicate a topological set including one of: a geographical area, a base station set, and a UE set; and the network node replacing the first service chain path ID by inserting the second service chain path ID in the header portion, wherein the packet is forwarded, to a second portion of the service chain, in accordance with the second service chain path ID.

2. The method according to claim 1, wherein the first service chain path ID is generated using at least one portion of a tag that is not used for generating the second service chain path ID.

3. The method according to claim 1, wherein the value of the first service chain path ID is different from the second service chain path ID generated from the retrieved one or more tags.

4. The method according to claim 1, wherein the first service chain path ID indicates a first set of subscribers and the second service chain path ID indicates a second set of subscribers.

5. The method according to claim 4, wherein the first and second subscribers are associated with at least one of: user classes, end-service types, and radio access types.

6. The method according to claim 1, wherein the first service chain path ID indicates a first service treatment and the second service chain path ID indicates a second service treatment.

7. The method according to claim 6, wherein the first and second service treatments specify one of: different sets of service functions, different return paths, different virtual network types, different instance types related to load balancing or replication.

8. The method according to claim 1, wherein the service chain path ID and metadata field are from a Service Function Chain Encapsulation header.

9. The method according to claim 1, wherein the length of the ID field is less than the length of the metadata field.

10. The method according to claim 1, wherein the length of the ID field is fixed and the length of the metadata field is non-fixed.

11. The method according to claim 1, wherein the service path chain ID field is a Service Function Path ID field.

12. The method according to claim 1, wherein the first and second portions of the service chains include one or more network service functions.

13. The method according to claim 1, wherein the one or more predefined rules are received from a network controller.

14. The method according to claim 1, wherein the first service chain path ID is generated by another network node that did not generate the tags for the metadata field.

15. A network node comprising:
a processor; and
a computer readable medium coupled to the processor, said computer readable medium containing instructions executable by the processor, whereby the network node is operative to:
receive, from a first portion of a service chain, a packet having a header portion that includes a first service chain path ID and a metadata field, wherein the first service chain path ID indicates a first area,
retrieve, according to one or more predefined rules, one or more tags included in the metadata field,
generate a second service chain path ID based on the one or more retrieved tags, wherein the second service chain path ID indicates a second area,
wherein the first and second areas indicate a topological set including one of: a geographical area, a base station set, and a UE set, and
replace the first service chain path ID by inserting the second service chain path ID in the header portion, wherein the packet is forwarded, to a second portion of the service chain, in accordance with the second service chain path ID.

16. A computer program product comprising a non-transitory computer readable storage medium storing program code executable by a processor of the network node to cause the network node to perform the actions of the method of claim 1.

* * * * *